United States Patent [19]
Bey et al.

[11] 3,765,778
[45] Oct. 16, 1973

[54] DIGITAL OPTICAL DENSITY FOR MEASURING THE DIFFERENCE IN OPTICAL DENSITY BETWEEN AN ABSORBER OF KNOWN DENSITY AND A SAMPLE ABSORBER

[76] Inventors: Paul P. Bey; Michael P. Bey, both of 4909 Abbott Dr., Temple Hills, Md. 20031

[22] Filed: Aug. 25, 1971

[21] Appl. No.: 174,827

[52] U.S. Cl. .................. 356/202, 355/77, 356/175, 356/223
[51] Int. Cl. ........................ G01n 21/06, G01j 3/46
[58] Field of Search ................. 356/40, 93, 96, 202, 356/175, 223

[56] References Cited
UNITED STATES PATENTS

| | | | |
|---|---|---|---|
| 3,528,749 | 9/1970 | Bowker | 356/223 |
| 3,664,744 | 5/1972 | Liston | 356/93 |
| 3,566,133 | 2/1971 | Dorman et al. | 356/40 |
| 3,100,264 | 8/1963 | Jaffe et al. | 356/96 |

FOREIGN PATENTS OR APPLICATIONS 999,670  7/1965  Great Britain .................. 356/81

*Primary Examiner*—Ronald L. Wibert
*Assistant Examiner*—V. P. McGraw
*Attorney*—R. S. Sciascia et al.

[57] ABSTRACT

An apparatus is provided for determining a difference in optical density between an absorber of known density and a sample absorber. An exponential decaying voltage is connected in series but of opposite polarity to a voltage source which is proportional to photodetector current flowing in a memory load. The current is generated by light of a specified wavelength passing through a standard optical absorber. The instant when the magnitude of the exponential voltage is equal to that generated by the photodetector, i.e., when the voltage across the combination is zero, the memory load is adjusted so that a specified number of clock pulses, $N_o$, (fixed by the clock frequency and the time constant of the exponential voltage) are counted by a ripple counter. A sample of unknown optical density at a specified wavelength is then measured, providing a voltage proportional to a selected calibrated memory standard. At the instant of time when this voltage, in combination with the exponential voltage is equal to zero, the difference in the optical density between the unknown and standard absorbers is equal to the absolute value of the difference between the reference count $N_o$ and the count in the ripple counter. The density information is gated into a decade counter and read out digitally.

Circuitry is provided for indicating positive or negative difference in density, and a reset automatically recycles the device at the end of a measurement. The density difference measurement is not affected by absolute light intensity or absolute photodetector sensitivity. This device is particularly useful in "White light" color printing methods.

7 Claims, 7 Drawing Figures

INVENTORS
PAUL P. BEY
MICHAEL P. BEY

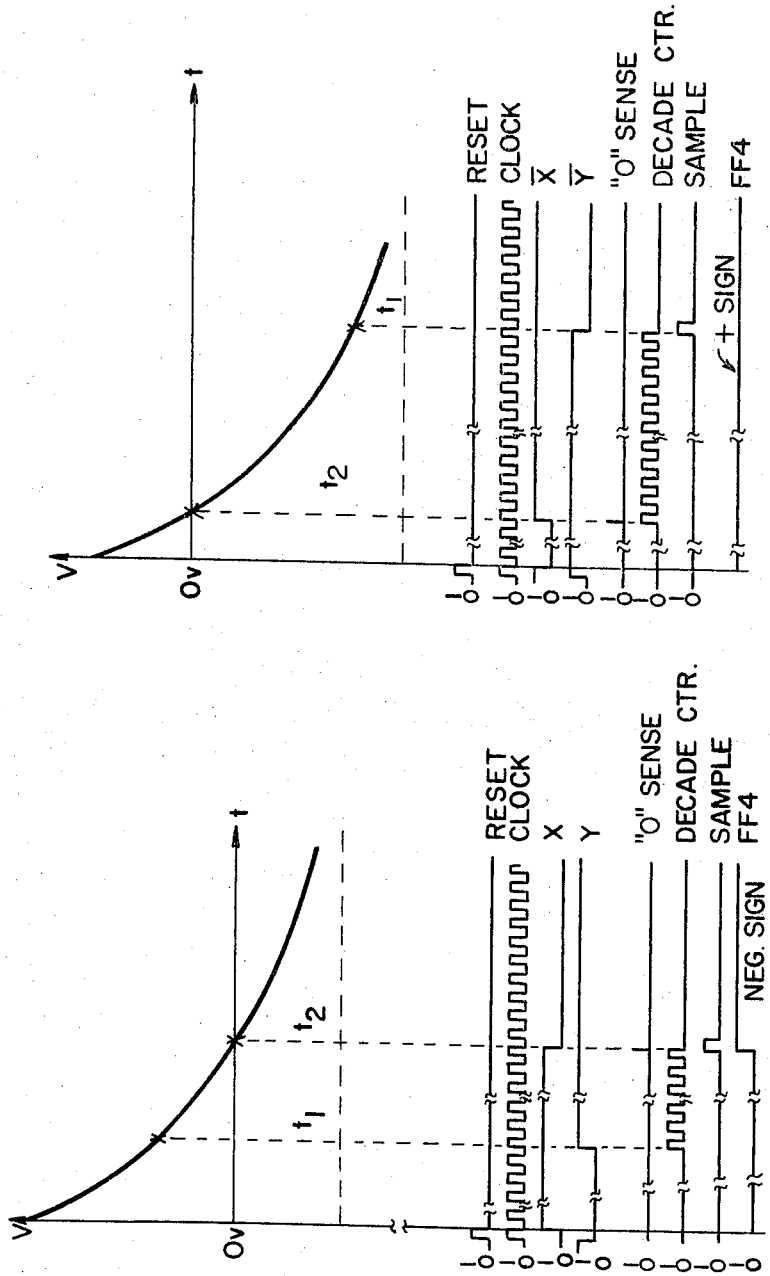

DIGITAL OPTICAL DENSITY FOR MEASURING THE DIFFERENCE IN OPTICAL DENSITY BETWEEN AN ABSORBER OF KNOWN DENSITY AND A SAMPLE ABSORBER

STATEMENT OF GOVERNMENT INTEREST

The invention described herein may be manufactured and used by or for the Government of the United States of America for governmental purposes without the payment of any royalties thereon of therefor.

BACKGROUND OF THE INVENTION

The present invention relates to an apparatus and method for determining a relative difference in optical density between a known calibrated optical standard and a sample optical absorber, such as photographic film, and is specifically directed to a digital optical densitometer.

The art of photography has long felt a need for an apparatus capable of quickly and accurately determining both positive and negative changes in the optical density of a sample absorber relative to that of a calibrated standard absorber. A major drawback in the prior art has been the fact that such devices lack accuracy and primarily, as typified by Bowker U. S. Pat. No. 3,528,749, most require a calibrated optical absorber simultaneously compared with the absorber under test throughout the operation of the equipment. As can easily be seen, this arrangement is mechanically cumbersome and awkward since the accuracy of such a device substantially depends on the skill of the operator and his ability to attain proper placement of the absorber under test as well as perform an alignment of the standard absorber.

The existing problem becomes more acute when trying to apply the prior art equipment to the "white light" color printing method. In fact, until now, no equipment has provided means for efficiently applying this color printing method. In this method the "white light" is reduced to the primary colors of red, blue, and green, each color being individually and sequentially manipulated. The quality of the resultant photographic print depends to a large extent on the accuracy of matching the ratio of primary color intensities for a photographic film to be printed to that of a reference with the objective of making these ratios equal. If the ratio of the primary color intensities on the film do not differ from that of the reference, the resultant print will accurately display the multitude of color combinations in the picture. Appropriate compensating filters must be used in order that the primary colors, through a neutral part of the negative, present a definite transmission. If the difference in density for the primary colors relative to that of the reference are equal, the ratio of the primary color intensities are also equal. Therefore, an apparatus capable of quickly determining the values of the compensating filters, which make the density differences of the primary colors equal, is desirable.

Considering the drawbacks of the prior art, we have developed an apparatus capable of accurately measuring relative differences in optical density compensation by utilizing, among other things, a decaying exponential voltage source coupled with a memory circuit; all of which obviate the difficult calibration tasks of the prior art and the need for identical intensities for accurate density measurements.

SUMMARY OF THE INVENTION

A reset pulse is triggered to start a decaying exponential voltage generated by an RC circuit. The voltage developed by photocurrent through a memory reference load is made equal to the exponential voltage at a particular time $t$, which corresponds to a reference count $N_o$. This photocurrent is generated by light of a specified wavelength passing through a reference absorber. A memory reference load bank is provided to relate the reference count to a multitude of different calibrated color standards. When the relative density of a sample absorber is to be measured, its corresponding color memory load is selected. A voltage proportional to the intensity of light at a specified wavelength is developed across the selected memory load and is compared to the decaying exponential voltage. At some point in time these two voltages will add to zero. When this occurs it is sensed and the time, as a function of counts in a ripple counter, is compared to the reference count $N_o$. Thus a positive or negative difference in count appears between the standard and the sample. This count is gated into a decade counter. The difference in count is indicative of the density difference between the standard and the sample. The reset pulse is again triggered at the end of the density measurement to recycle the logic to provide substantially continuous readings. Also, intensity monitors are provided to assure that the intensity of the light required by the sample is within the operational tolerance of the system. If the intensity for a particular sample does not fall within the operating range an intensity control potential is varied to change the amplitude of the decaying exponential voltage without affecting the calibrated timing characteristics of the system.

OBJECTS OF THE INVENTION

It is therefore an object of the present invention to detect and indicate both positive and negative differences in density of an optical absorber relative to a selected standard absorber.

A further object of the present invention is to determine the relative density difference between two absorbers without regard to the specific value of their individual densities.

Another object of the present invention is to store many different density standards such that the density of each color to be measured can be compared to its individual precise standard.

Another object of the invention is to provide density difference information in the form of a ratio so that parameters such as absolute intensity of the light source and intensity potentials do not affect the measurement.

A further object of the present invention is to provide a densitometer capable of rapid updating so that accurate density information can be obtained at all times.

Another object of the present invention is to provide an accurate digital densitometer capable of controlling an automatic color compensation system.

These and other objects and advantages will become more fully apparent to those skilled in the art from the following description taken in conjunction with the accompanying drawings in which the like reference numerals designate like parts and wherein:

DRAWINGS

FIG. 4 is a graphical showing of the relationship between the decaying exponential voltage and the circuit logic for a positive density difference wherein the density must be subtracted to conform to the calibrated absorber; and FIG. 5 is a graphical description of the relationship between the decaying exponential voltage and the circuit logic for a negative density difference wherein the density must be added to conform to the calibrated absorber.

DETAILED DESCRIPTION

Figure 1:
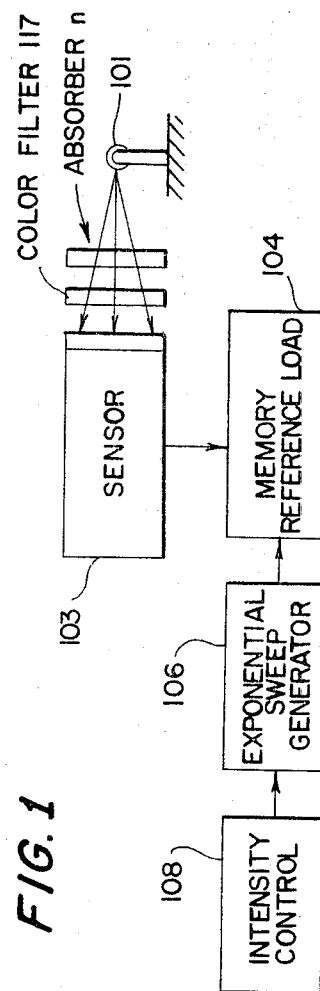
FIG. 1 is a functional block diagram depicting an embodiment of the invention.

Referring to the block diagram in FIG. 1, optical density information is presented to sensor 103 through absorber n and color filter 117. The sensor, a photomultiplier, provides a current directly proportional to the intensity of light impinging upon its surface from light source 101 after the light through color filter 117 of a specified wavelength $\lambda_n$ has passed through absorber n. Thus the current generated by the sensor, expressed as a function of density is:

$$I_n = \tau_n k(I) 10^{-(D_n)} \quad (1)$$

where $k$ is the sensitivity of the sensor, $\tau_n$ is the optical intensity of the color selectivity filter 117 for wavelength $\lambda_{n a}$, $I$ is the source intensity, and $D_n$ is the density of the absorber 20. The current $I_n$ generated by the sensor is applied to memory standard 104 which converts the current into a proportional voltage by the equation:

$$V_n = I_n R_n \quad (2)$$

where $R_n$ is the resistance of the memory standard selected. Clearly the value of $R_n$ determines the value of current needed to produce a particular voltage.

Figure 2:
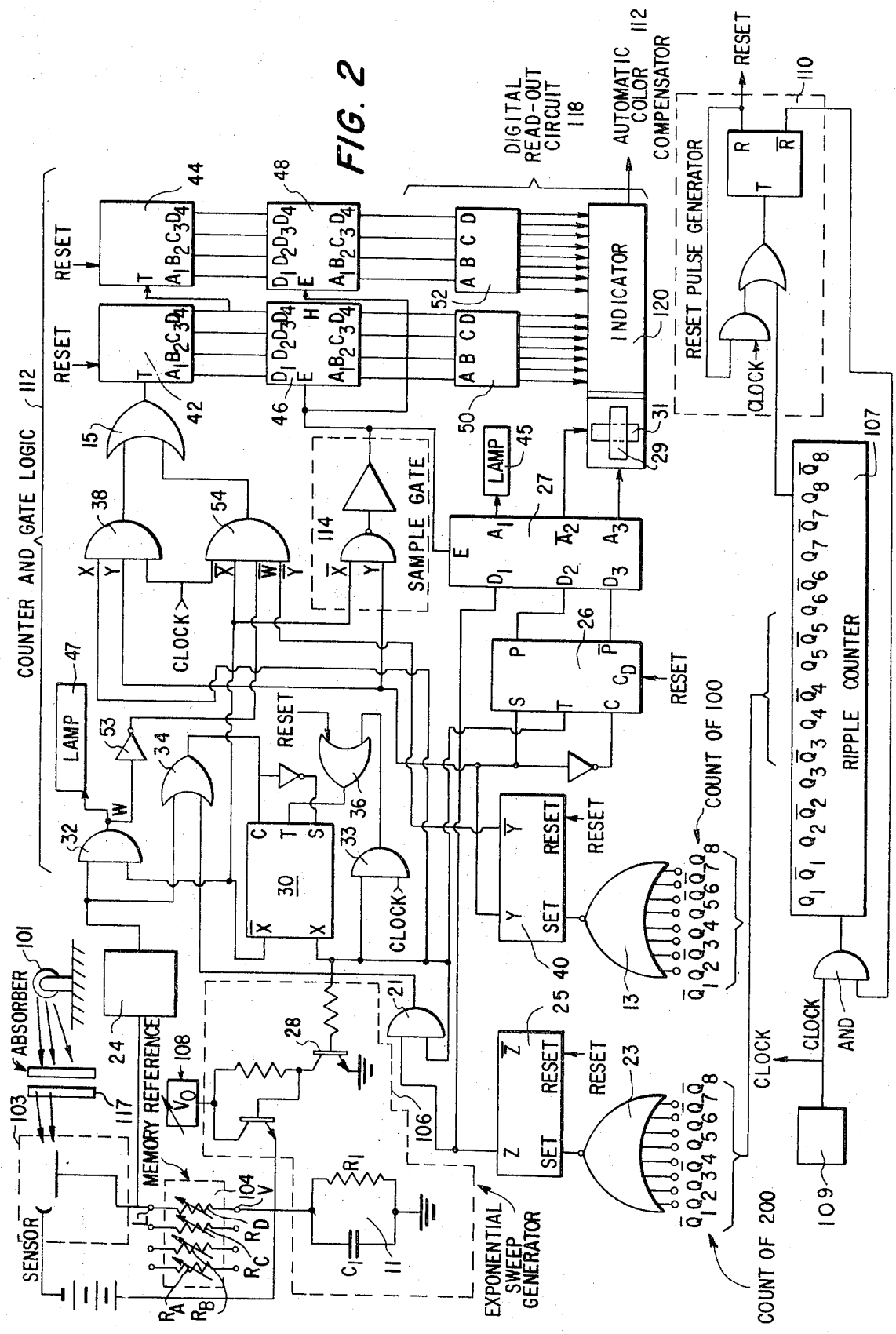
FIG. 2 is a schematic diagram of an apparatus embodying the invention.

The memory standards $R_n$ are variable resistors, such as $R_a$, $R_b$, $R_c$ and $R_d$ in FIG. 2. As an example assume $R_a$ corresponds to the memory reference load for a specified wavelength $\lambda_a$. From equation (1) the reference current produced by the sensor is:

$$I_a^{ref} \lambda = \lambda \tau_a k(I) 10^{-(D \, ref)} \quad (3)$$

where $D_a^{ref}$ is the optical density of the reference optical absorber. From equation (2) the voltage impressed upon memory standard $R_a$ for this example becomes:

$$V_a^{ref} = I_a^{ref} R_a \quad (4)$$

Memory standard $R_a$ can now be adjusted to produce a precise voltage $V_a^{ref}$ equal to $V_R$. The memory reference load is designed such that a particular reference load $R_n$ can be selected and adjusted to provide a constant $V_R$ developed by current $I_n^{ref}$.

Considering any wavelength $\lambda_n$, and the corresponding $R_n$, the same $V_R$ can be obtained by the adjustment of the color's respective memory reference load thereby providing a density reference for as many colors as one wishes to calibrate. When an unknown color density for a particular color is to be measured, the resultant photocurrent will generate a voltage equal to, less than, or greater than $V_R$ depending on whether the density being measured is respectively equal to, greater than, or less than the particular calibrated density reference.

Applied in series with the voltage $V_n$, across the memory reference load 104, is a decaying exponential voltage of opposite polarity generated by the sweep signal 106 and triggered by the reset pulse 110. The decaying exponential voltage $V_{R_1 C_1}$ is developed to off-set the voltage $V_n$ such that the resultant voltage $V_L = V_{R_1 C_1} - V_n$. The amplitude of the exponential voltage, $V_o$, is controlled by intensity control 108 which provides an adjustable d.c. level to the sweep circuit. The general equation for the decaying exponential is:

$$V_{R_1 C_1} = V_o \exp[-t/\tau] \quad (5)$$

or $$t = \tau \ln [V_o / V_{R_1 C_1}] \quad (6)$$

Figure 3C:
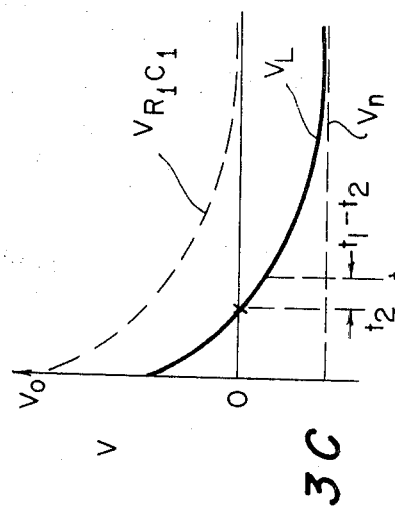
FIG. 3C is an exponential voltage for the measurement of a second sample optical absorber.
Figure 3A:
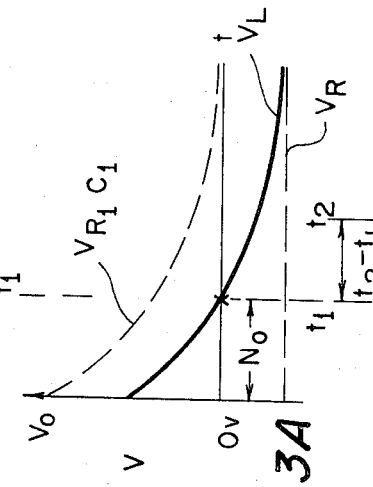
FIG. 3A is a graphical representation of an exponential decaying voltage due to a calibrated optical absorber of a specified color.

For a selected value of $V_o$, the memory reference load $R_n$ is adjusted so that the voltage $V_n^{ref} = V_R$ and $V_L = 0$ at a specified time $t_1$. Then equation (6) becomes:

$$t_1 = \ln [V_o / V_R] \quad (7)$$

as shown in FIG. 3A. At time $t_1$, zero pulses are counted by the decade counter 112.

Figure 3B:
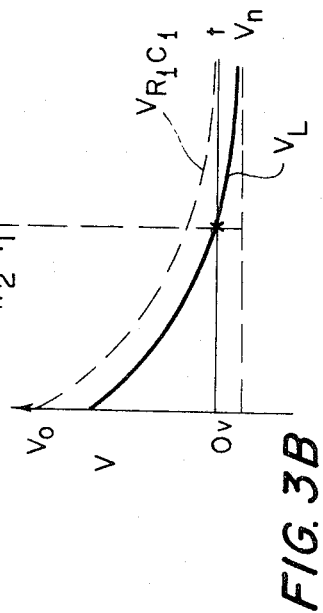
FIG. 3B is an exponential function for the measurement of a sample optical absorber.

As shown in FIG. 3B, a voltage $V_n$, which is smaller in magnitude than $V_R$ is generated by photocurrent produced by light of wavelength $\lambda n$ passing through an unknown absorber of density greater than that of the reference. Then $V_L = 0$ at a later time $t_2$, as compared to $t_1$, such that Eq. (6) becomes $$t_2 = \tau \ln [V_o / V_n] \quad (8)$$

subtracting equation Eq. (7) from Eq. (8), $$t_2 - t_1 = \tau \ln [V_R / V_n] \quad (9)$$

Since $[V_e / V_n] = 10[D_R - D_n]$ (from Eq. (1-4)), $t_2 - t_1$ is proportional to the difference in density between the reference and the unknown absorbers. The count in the decade counters is $N - N_o$ where $N$ is the number of counts in the ripple counter at time $t_2$ and $N_o$ is the number of counts in the ripple counter at time $t_1$. The difference in count is proportional to the increase in the unknown absorber density relative to that of the reference absorber.

If the density of the unknown absorber is less than that of the reference, $V_n$ is greater in magnitude than the exponential voltage $V_R$ and the magnitude of the exponential voltage $V_{R_1C_1}$ is equal to $V_n$ at an earlier time $t_2$, compared to time $t_1$, as shown in FIG. 3C. The sensing of zero indicates the time $t_2$ and $t_1-t_2$ is obtained. This difference in time is measured as $N_o-N$. The time difference is proportional to the decrease in density of the unknown absorber relative to that of the reference absorber.

The time difference is then converted into decimal counts by the decade counter and gate logic 112 with time $t_1$ corresponding to the particular reference count of zero. At the end of a measurement cycle, sample gate 114 triggers the digital read-out circuitry 118 providing useful density difference information to an indicator 120 and/or filter compensation system 122. Intensity indicators 116, inform the operator whether or not he has correctly adjusted $V_o$ intensity control 108.

Turning now to FIG. 2, an understanding of the circuit can best be made by setting forth the operation of the circuit under calibration procedures, and then considering the operation of the device when two different unknown color densities are to be measured.

CALIBRATION

Current generated by photomultiplier sensor 103, produced by light of wavelength $\lambda_n$ passing through an optical absorber, enters the circuit at point $L$. The voltage at point $L$ can be written as follows:

$$V_L = V_{R_1C_1} - V_d \tag{10}$$

where $V_d$ is the voltage across the selected memory reference load $R_d$ and:

$$V_{R_1C_1} = V_o \exp[-t/R_1C_1] \tag{11}$$

Therefore from Eq. (10):

$$V_L = V_o \exp[-t/R_1C_1] - V_d \tag{12}$$

$V_L$ is forced to zero by the decaying exponential, generated by sweep generator 106, at some time $t = t'$ so that $$V_d = V_o \exp[-t'/R_1C_1] \tag{13}$$

or $$t' = 2.31 \, R_1C_1 \log_{10}[V_o/V_d] \tag{14}$$

The time in units of the clock period can be expressed as $$t' = NT \tag{15}$$

where $N$ is the number of pulses counted in time $t'$.

To assure that a particular count $N_o$ appears in the ripple counter at $t' = t_1$, the time constant $\tau(R_1C_1)$ and the clock frequency are chosen as follows:

From Eq. (15), $t' = t_1$ can be expressed as:

$$t_1 = N_o T \tag{16}$$

The selection of $N_o$ depends upon the precision and range required for the device. For any range of density difference measurement $\Delta D$, $N_o$ would be chosen to equal $(\Delta D)(10^j)$ and $j$ selected equal to 1, 2, 3... depending on the precision required (the precision increases with $j$). For a density difference range $\Delta D = \pm 1.0$, $N_o$ is chosen to equal 10, 100, or $10^j$, ($j = 1, 2, 3,...$).

We have found that for a density range $\Delta D = \pm 1.0$ and for purposes herein $N_o = 100$ clock pulses (corresponding to $j = 2$), measured at time $t_1$, provides sufficient precision for density measurements even though greater precision is possible.

Therefore from Eq. (16);

$$t_1 = 100 \, T \tag{17}$$

and from Eq. (7 and 14) we write:

$$100 \, T = t_1 = 2.31 \, R_1C_1 \log_{10}[V_o/V_R] \tag{18}$$

The clock frequency and the time constant $R_1C_1$ are selected such that:

$$10^j = 100 = 2.31 \, R_1C_1/\tau, \tag{19}$$

for $j = 2$.

Substituting Eq. (19) into Eq. (18)

$$100 = 100 \log_{10}[V_o/V_R] \tag{20}$$

or $$V_R = V_o/10 \tag{21}$$

The variable resistor $R_d$, as well as each of the other memory reference standards $R_n$, can be adjusted such that $V_n^{ref}$ across these loads, for light of wavelength $R_n$ passing through a reference absorber, is equal to $V_R$ and conforms with the proportion established by Eq. (21).

EXAMPLE I

Assume that the density of the sample absorber is greater than the absorber of known density. The photocurrent then generates a voltage $V_n$ across the selected memory load which is less than $V_R$. As can best be seen in FIG. 4, with reference made to FIG. 2, reset generator 110 resets the count in the ripple counter to zero and sets $X = 1$ in flip-flop 30. This starts the exponential sweep from generator 106 and simultaneously pulses are gated into the ripple counter 107. The sweep begins from an initial voltage $V_o$ adjusted by intensity control 108.

The logic state of $X = 1$ is applied to AND gate 38. Also applied to the inputs of AND gate 38 are the continuous clock pulses from clock 109 and the signal $Y$ from flip-flop 40. As can be seen from FIG. 2, $Y$ will remain 0 until ripple counter 107 counts 100 clock pulses ($\bar{Q}_1 Q_2 \bar{Q}_3 Q_4 Q_5 \bar{Q}_6 \bar{Q}_7 Q_8$). At the count of 100, which corresponds to the calibrated reference time $t_1$, NOR gate 13 sets flip-flop 40 and as a result $Y = 1$. $Y$ will remain high until the next reset pulse appears.

At the count of 100, with $Y = 1$, AND gate 38 is no longer inhibited. Therefore clock pulses are gated into OR gate 15. From equations (9) and (19), the period of the clock pulse was specifically chosen to indicate a particular incremental density difference. Therefore each clock pulse which originates from AND gate 38, and gated through OR gate 15 is proportional to the density difference. Since 38 is uninhibited at the count of 100, or $N_o$, the number of pulses counted by the decade counters 42 and 44 will be counted with respect to the density reference. The clock pulses are counted until time $t_2$, when the magnitude of decaying exponential voltage equals $V_n$, that is $V_L = 0$ which is sensed by zero sensing amplifier 24. The sensing of a zero produces a pulse to OR gate 34, which in turn resets flip-flop 30. The resetting of flip-flop 30 switches $X = 0$ which inhibits AND gate 38. Thus, as can readily be seen, clock pulses to the decade counters 42 and 44 are stopped, and the true density difference information, corresponding to a count of $N$ appears therein:

$$N = 100 \log_{10}[V_R/V_N] = 100 [D_n - D_n^{ref}]$$

(22)

from Eq. (9 and 19). At the end of the count, sample gate 114 provides a pulse to quad-latch 46 and 48, yielding a parallel shift of information to decoder driver 50 and 52. The information becomes readable as a result of digital indicator 118. If the count in the ripple counter 102 reaches 200 before a pulse is generated by zero sensing amplifier 24, $Z$ is set to equal 1 which produces a pulse to OR gate 36, which resets flip-flop 30 and switches $X = 0$. This turns on range lamp 43 indicating that the measurement is outside the preset range of the device.

In this example to ascertain that the count is greater than the reference count (indicating that the density is greater), one merely has to examine the state of flip-flop 26. In this case, at the end of the count, when $X$ went from 1 to 0 and $Y$ equals 1. This combination sets $A_3$ of latch 27 high which turns on lamp 29. Lamp 29 is in the form of a minus sign to indicate that "density" must be subtracted from the absorber of unknown density to make its density equal to that of the reference absorber.

EXAMPLE II

For this example, assume that the absorber of unknown density is greater than the calibrated absorber. The photocurrent then generates a voltage $V_n$ across the memory reference loads which is greater than the voltage $V_R$. As can best be seen in FIG. 5 with reference made to FIG. 2, reset generator 110 resets the count in the ripple counter 107 to zero and $X = 0$ in flip-flop 30. This starts the exponential sweep from generator 106, and simultaneously pulses are gated into the ripple generator 106, and simultaneously pulses are gated into the ripple counter 107.

The logic state of $X = 0$ is applied to AND gate 54. Also applied to the inputs of AND gate 54 are the continuous clock pulses from clock 109, $\bar{W} = 1$ and $\bar{Y} = 1$. When $V_L = 0$ a pulse is generated by zero sensing amplifier 24. The pulse from amplifier 24 sets $\bar{X} = 1$. With $\bar{Y}$ set high from the reset pulse, AND gate 54 is no longer inhibited, and as a result clock pulses are counted by decade counters 42 and 44. The count in the decade counters continues until AND gate 54 becomes inhibited by $\bar{Y}$. At the count of 100 ($N_o$) in the ripple counter 107, which corresponds to the calibrated reference time $t_1$, NOR gate 13 sets flip-flop 40 and as a result $\bar{Y}$ 0. With $\bar{Y} = 0$ AND gate 54 becomes inhibited and the clock pulses to the decade counters 42 and 44 are stopped. The number of clock pulses (which are incrementally proportional to the density) that appear in the decade counters are 100 ($N_o$) minus the count in the ripple counter at $t_2$, as long as $t_2$ occurs before reference time $t_1$. Thus, as can readily be seen, the true density difference information, corresponding to the count of $N$, appears in decade counters 42 and 44:

$$N = 100 \log_{10}[V_a/V_R] = 100 (D_n^{ref} - D_n)$$

(23)

(from Eq. (9) and (19))

At the end of the count, sample gate 114 provides a pulse to quad latch 46 and 48, yielding a parallel shift of information to decoder driver 50 and 52. (If $V_n$ is greater than $V_o$, W is set to 1 which turns on lamp 47 indicating that the measurement is outside the preset range of the device).

In this example, to ascertain that the count is less than the reference (indicating that the density is less), one merely has to examine the state of flip-flop 26. In this case when $X$ goes from 1 to 0, $Y$ was equal to 0. This put $\bar{A}_2$ and $A_3$ high in latch 27. Correspondingly the combination of lamps 29 and 31, which are in the form of a "+," turn on. The positive sign indicates that "density" must be added to the absorber of unknown density to make its density equal to the reference density.

Thus the proper filter compensation is obtained be either subtracting the corresponding density difference, as in EXAMPLE I or by adding the corresponding density difference as in EXAMPLE II.

It should be noted that density difference measurements do not depend on source intensity $I$ or potential $V_o$ as long as these quantities remain constant during a measurement.

We will now demonstrate how adjustments of voltage, $V_o$, and the source intensities are utilized to provide a minimum number of compensating filters to obtain a correct color balance for a negative to be printed.

To determine the densities of the compensating filters for the measured negative to be printed, two procedures can be followed: compensating filter combinations (standard filter pack), which provides a good color balance for a reference negative when placed adjacent to the white light source is either (1) placed adjacent to the white light source during density measurement of the measured negative or (2) not adjacent to the white light source during density measurements. In the first case, the filter pack for the negative to be printed is obtained by adding or subtracting the density measurements from the densities of the compensating filters in the standard filter pack. In the second case, the color pack for the negative to be printed is determined directly by the density measurements.

In both cases calibration of the memory is made by measurements of the reference negative with the standard filter pack adjacent to the white light source. With $V_o = V_o^{ref}$, the memory voltages $V_i^{ref}$ are adjusted so that $V_i^{ref} = V_R^{ref}$ ($i = a,b,c$) so that a count of zero is obtained.

In general, where $D_i^{ref}$ ($i - a,b,c$) are the densities of the reference negative in combination with their corresponding compensating filters for wavelengths $\lambda_i$, compensating Filters of densities $D_i^F$ must be added or subtracted in order that, $$I_a/I_a^{ref} = I_b/I_b^{ref} = I_c/I_c^{ref} \tag{24}$$

for a correct color balance of a measured negative. In Eq. (24), $I_i$ are the intensities of light transmitted through the measured negative or measured negative and standard color pack if the standard color pack is placed adjacent to the white light source and $I_i^{ref}$ are the intensities of light transmitted through the standard color pack and reference negative.

Where $K$ is any constant, Eq. (24) can be satisfied if:
(1) For $D_i^{ref} + K > D_i$, a compensating filter of density $D_i^F$ is added so that $$D_i^{ref} + K = D_i + D_i^F. \tag{25}$$

(2) For $D_i^{ref} + K < D_i$, a compensating filter of density $D_iF$ is subtracted so that $$D_i^{ref} + K = D_i - D_i^F. \tag{26}$$

Measurement at wavelength $\lambda_a$ for the measured negative gives the result, $$n_2 - n_1 = 100 \log_{10}(V_a/V_R), \tag{27}$$

if $V_a > V_R$.

We will consider the case where $I'/I$ and $V_o/V_o^{ref}$ and then $$V_a = R_a k_a \tau_a T_a I'$$
$$I' = C_1 I$$
$$V_o = C_2 V_o^{ref}$$
$$V_R = C_2 V_R^{ref} = C_2 R_a k_a \tau_a T_a^{ref} I, \tag{28}$$

where $C_1$ and $C_2$ are constants.

Substituting from Eq. (28) into Eq. (27), $$n_2 - n_1 = 100 \log_{10} R_a k_a T_o \tau_a C_1 / R_a k_a T_a^{ref} \tau_a C_2 I$$
$$= 100 (\log_{10} T_a/R_a^{ref} + \log_{10} C_1/C_2) \tag{29}$$

$$= 100 (\log_{10} 1/T_a \text{ ref} + \log_{10} 1/T_a + K_1),$$
$$= 100 (D_a \text{ ref} - D_a + K_1),$$

where $T_a$ and $T_a$ref are transmissions through the reference and measured negatives, respectively, and $K_1 = 100 \log_{10}(C_1/C_2)$. Similar expressions are obtained for wavelengths $\lambda_b$ and $\lambda_c$.

The time measured in units of clock counts in Eq. (29) is equal to 100X the density of the compensating filter (Eq. 25) to be added for a correct color balance of the measured negative.

The constants $C_1$ and $C_2$ can be varied by adjustments of $I'$ and voltage $V_o$ so that, $$100K = 100 (D_a - D_a^{ref}), \tag{30}$$

corresponding to zero correction for wavelength $\lambda_a$. The The compensating filters to add or subtract for a color balance of the measured negative are those determined from the clock count for measurements at wavelengths $\lambda_b$ and $\lambda_c$, providing a minimum number of compensating filters for a color balance of the negative to be printed.

It is believed that the inventive method and apparatus has been described with sufficient detail to enable one skilled in the art to practice the teachings contained herein. It is anticipated that many structural variations as well as electronic circuit equivalents may occur to those skilled in the art without there arising a departure from the spirit and scope of the invention.

What is claimed is:

1. A device for measuring a density difference between a known calibrated reference and a measured density comprising:
   detecting means for providing a current proportional to an exponential of the measured density;
   memory standard means having a plurality of individual memory loads connected to said detecting means for establishing a particular voltage corresponding to said current;
   exponential sweep means connected to said memory standard means for generating an exponential sweep voltage wherein said exponential sweep means and said memory standard means together provide a voltage representing the sum of said particular voltage and the exponential voltage, the sum voltage being driven to a specific d.c. level;
   d.c.-level-sensing means connected to said memory standard means for providing a pulse when said sum voltage is driven by said exponential sweeping means to said specific d.c. level;
   counting means for determining a count indicative of a time difference between a calibrated point corresponding to the density of said known calibrated reference and said pulse;
   digital read-out means connected to said counting means for converting said count into usable digital data.

2. A device as claimed in claim 1 further comprising:
   gating means incorporated in said counting means for providing information as to whether said count corresponds to a density less or greater than said calibrated reference;
   indicator means connected to said gating means for displaying said information.

3. A device as claimed in claim 1 wherein said time difference is expressed as:

$$\tau \ln [V_R/V_n]$$

wherein $\tau$ is a selected time constant of said exponential sweep means, and $V_n$ is said particular voltage, and $V_R$ is a voltage representing said known calibrated reference.

4. A device as claimed in claim 1 wherein said memory standard means are a bank of resistors, each corresponding to a different known calibrated reference wherein any one of said resistors can be connected to said detecting means at will.

5. A device as claimed in claim 1 further comprising: intensity control means connected to said exponential sweep means for varying the magnitude of said exponential sweep.

6. A device as claimed in claim 1 further comprising:
latch means connected to said counting means for holding said count;
sampling means connected to said latch means and said digital read-out means for a variable rate of sampling said count wherein said latch means holds said sample means intermittently to sample said count and present said count to said digital read-out means..

7. A device as claimed in claim 1 wherein said sensing means is a photomultiplier.

* * * * *

PO-1050
(5/69)

UNITED STATES PATENT OFFICE
CERTIFICATE OF CORRECTION

Patent No. 3,765,778  Dated October 16, 1973

Inventor(s) Paul P. Bey and Michael P. Bey

It is certified that error appears in the above-identified patent and that said Letters Patent are hereby corrected as shown below:

In the Title, after "Density" insert -- Device --

Signed and sealed this 23rd day of April 1974.

(SEAL)
Attest:

EDWARD M.FLETCHER,JR.
Attesting Officer

C. MARSHALL DANN
Commissioner of Patents

MELVIN L. CRANE
Acting Patent Counsel